(12) United States Patent
Klimov

(10) Patent No.: US 7,895,327 B2
(45) Date of Patent: Feb. 22, 2011

(54) DEVICE, SYSTEM, AND METHOD OF OBFUSCATING DATA PROCESSED WITHIN AN INTEGRATED CIRCUIT

(75) Inventor: Alexander Klimov, Hadera (IL)

(73) Assignee: Discretix Technologies Ltd., Kfar Netter (IL)

( * ) Notice: Subject to any disclaimer, the term of this patent is extended or adjusted under 35 U.S.C. 154(b) by 58 days.

(21) Appl. No.: 12/170,450

(22) Filed: Jul. 10, 2008

(65) Prior Publication Data
US 2009/0016528 A1 Jan. 15, 2009

Related U.S. Application Data

(60) Provisional application No. 60/929,784, filed on Jul. 12, 2007.

(51) Int. Cl.
*G06F 15/173* (2006.01)
(52) U.S. Cl. .............. 709/225; 709/200; 709/223; 709/224; 709/226; 713/300; 713/340

(58) Field of Classification Search ............... 709/200, 709/223, 224, 225, 226; 707/2, 9, 10; 713/300, 713/340
See application file for complete search history.

(56) References Cited

U.S. PATENT DOCUMENTS

| | | | |
|---|---|---|---|
| 5,881,287 A * | 3/1999 | Mast | 717/127 |
| 6,320,965 B1 * | 11/2001 | Levine | 380/34 |
| 6,338,142 B1 * | 1/2002 | Alsaadi | 713/323 |
| 6,870,090 B2 * | 3/2005 | Agrawal et al. | 174/394 |
| 7,007,025 B1 * | 2/2006 | Nason et al. | 707/9 |
| 7,454,323 B1 * | 11/2008 | Bain | 703/13 |
| 2005/0149486 A1 * | 7/2005 | Nason et al. | 707/1 |

* cited by examiner

*Primary Examiner*—Liangche A Wang
(74) *Attorney, Agent, or Firm*—Eitan Mehulal Law Group

(57) ABSTRACT

Device, system, and method of power trace obfuscation. In some embodiments an integrated circuit may include a signal modifier to introduce a pseudo-randomly selected modification to a state-transition pattern of at least one signal, which is related to internal processing of data within the integrated circuit. Other embodiments are described and claimed.

20 Claims, 8 Drawing Sheets

DEVICE, SYSTEM, AND METHOD OF OBFUSCATING DATA PROCESSED WITHIN AN INTEGRATED CIRCUIT

CROSS-REFERENCE

This application claims priority from and the benefit of U.S. Provisional Patent application 60/929,784, entitled "Method and device for power trace obfuscation", filed Jul. 12, 2007, the entire disclosure of which is incorporated herein by reference.

BACKGROUND

A cryptographic device, e.g., a cryptographic Integrated Chip (IC), may receive input data and generate output data by internally processing secret data, for example, an encryption key, a secret key, secret information decrypted from the input data, and/or any other suitable data.

One or more parameters, representing "side effects" that are related to an operation of the cryptographic device, may be correlated with the secret data. For example, a variation in a power consumption and/or Electro-Magnetic (EM) radiation of the cryptographic device may be correlated with the secret data being processed by the device. Therefore, an attempt to detect the secret data ("an attack") may include measuring one or more side effects of the device in order to deduce and/or reveal the secret data. For example, a side channel attack, e.g., a Differential Power Analysis (DPA) attack, may include analyzing the power consumption of the cryptographic device to reveal the secret data.

One approach for counteracting a DPA attack may include using a dual-rail pre-charge logic, as described in "*Masked Dual-Rail Pre-Charge Logic: DPA-Resistance without Routing Constraints*", Thomas Popp and Stefan Mangard, *Cryptographic Hardware and Embedded Systems* (*CHES*) 2005. However, this implementation results in significant increases in area.

Another counteract approach includes masking the secret data. However, such implementation may be inefficient if glitches occur within logical circuits of the cryptographic device, as described in "*Successfully Attacking Masked AES Hardware Implementations*", Stefan Mangard, Norbert Pramstaller and Elisabeth Oswald, *CHES* 2005.

SUMMARY

Some embodiments include, for example, devices, systems and methods of obfuscating data, e.g., secret data, processed within an Integrated Circuit (IC) or the like.

In some embodiments, a pseudo-randomly selected modification may be applied to a state-transition pattern of at least one signal, which is related to, and/or involved in, the processing of the secret data. In one embodiment, the signal may include or may be part of the secret data. In another embodiment, the signal may not be part of the secret data, but may be processed together with the secret data, and/or may affect the processing of the secret data in any suitable manner.

In some embodiments, the pseudo-randomly selected modification may impose changes in the power consumption and/or Electro-Magnetic (EM) radiation of the IC, which may be reflected on power lines of the IC, in a manner, which may not be predicted by an external viewer, e.g., a hostile external viewer or an attacker. As a result, it may be virtually impossible for the external viewer to deduce and/or reveal the secret data by measuring and/or interpreting the changes in the power consumption and/or EM radiation.

Some embodiments include an integrated circuit including a signal modifier to introduce a pseudo-randomly selected modification to a state-transition pattern of at least one signal, which is related to internal processing of data within the integrated circuit.

In some embodiments, the signal modifier is to generate at least one modified signal by introducing the pseudo-randomly selected modification to a state-transition pattern of an input signal. The integrated circuit may include a logical circuit to perform a logical operation on the modified signal.

In some embodiments, the signal modifier is to introduce a pseudo-randomly selected modification to at least one of a number and a timing of one or more state transitions of the signal within a clock cycle.

In some embodiments, the signal modifier is to delay the signal for a pseudo-randomly selected delay period.

In some embodiments, within the clock cycle, a number of state transitions in the modified signal and a number of state transitions in the input signal have the same parity.

In some embodiments, the signal modifier is to delay the input signal for a predefined delay period, and to perform a logical XOR operation on the delayed signal and a transitional-glitch signal pseudo-randomly selected from at least first and second predefined transitional-glitch signals of different durations.

In some embodiments, a first state transition of the first glitch signal and a first state transition of the second glitch signal occur substantially simultaneously; a second state transition of the first glitch signal occurs before a second state transition of the second glitch signal; and a length of the predefined delay period depends on the second state transition of the second glitch signal.

In some embodiments, the signal modifier is to mask the result of the XOR operation according to a mask signal, which is based on the length of the predefined delay period and the second state transition of the second glitch signal.

In some embodiments, the signal modifier may include two or more function modules to generate at least one set of two or more respective intermediate signals by applying to at least one input signal two or more logically identical functions having at least two different delay periods, respectively; and at least one selector to generate at least one modified signal, respectively, by pseudo-randomly selecting one of the two or more intermediate signals.

In some embodiments, the integrated circuit may include a cryptographic integrated circuit to receive input data and generate output data by internally processing the data. A power consumption of the cryptographic integrated circuit is statistically independent of the data.

In some embodiments, a method of obfuscating data internally processed within an integrated circuit may include introducing a pseudo-randomly selected modification to a state-transition pattern of at least one signal, which is related to the processing of the data.

In some embodiments, the method may include performing a logical operation on a modified signal resulting from the introducing of the pseudo-randomly selected modification.

In some embodiments, the introducing may include introducing a pseudo-randomly selected modification to at least one of a number and a timing of one or more state transitions of the signal within a clock cycle.

In some embodiments, the introducing may include delaying the signal for a pseudo-randomly selected delay period.

In some embodiments, within the clock cycle, a number of state transitions in a modified signal resulting from the introducing and a number of state transitions in the signal have the same parity.

In some embodiments, the introducing may include delaying the signal for a predefined delay period; and performing a logical XOR operation on the delayed signal and a transitional-glitch signal pseudo-randomly selected from at least first and second predefined transitional-glitch signals of different durations.

In some embodiments, a first state transition of the first glitch signal and a first state transition of the second glitch signal occur substantially simultaneously; a second state transition of the first glitch signal occurs before a second state transition of the second glitch signal; and a length of the predefined delay period depends on the second state transition of the second glitch signal.

In some embodiments, the introducing may include masking the result of the XOR operation according to a mask signal, which is based on the length of the predefined delay period and the second state transition of the second glitch signal.

In some embodiments, the method may include applying to the at least one signal two or more logically identical functions having at least two different delay periods, respectively, thereby to generate at least one set of two or more respective intermediate signals; and generating at least one modified signal by pseudo-randomly selecting one of the two or more intermediate signals.

In some embodiments, a power consumption of the integrated circuit is statistically independent of the data.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
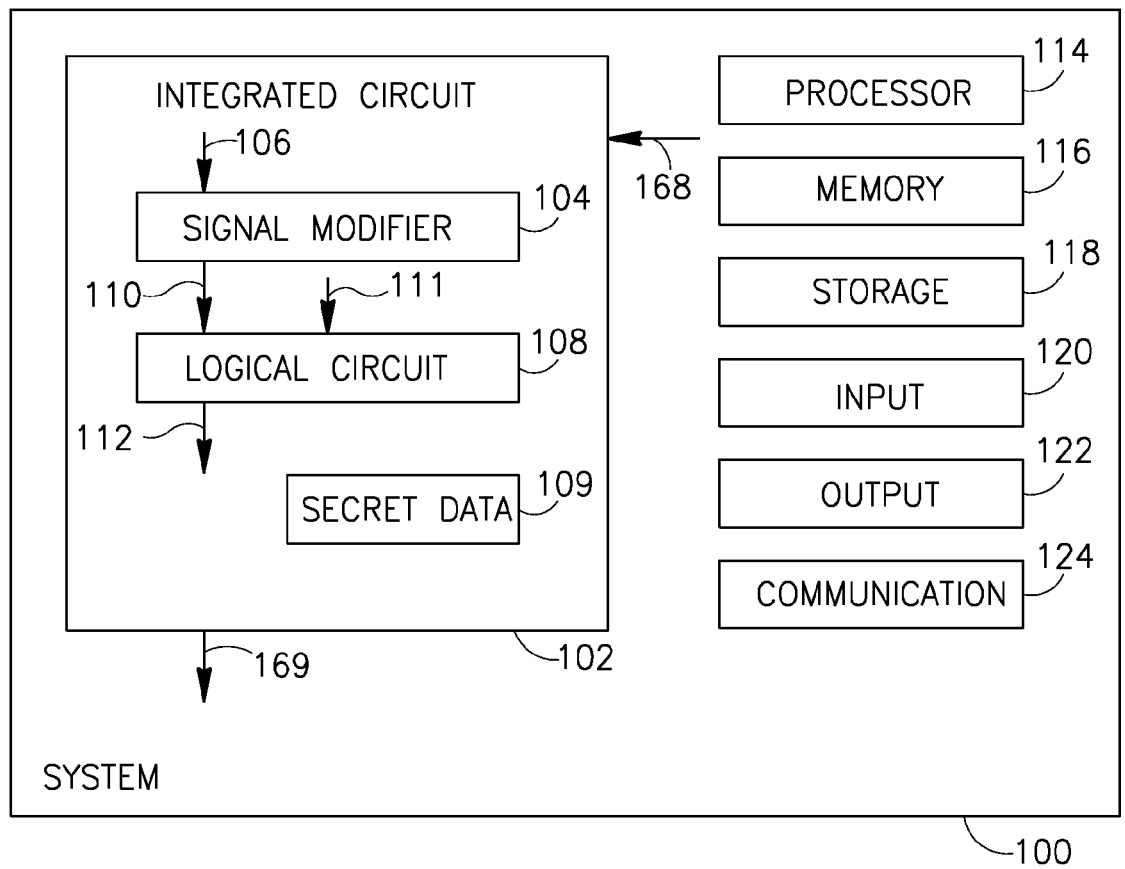
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

The terms "random" and "pseudo-random" may interchangeably be used herein to include, for example, random, pseudo-random, unpredictable and/or haphazard. For example, the terms "random" and/or "pseudo-random" as interchangeably used herein may relate to one or more items that are, or appear to be, e.g., to a viewer lacking information regarding a scheme used for generating the items, lacking an order and/or pattern, lacking predictability, lacking a definitive pattern, haphazard, chaotic, disorganized; and/or one or more items that are generated or produced by a process whose output does not, or does not appear to, follow a describable, predictable, definitive and/or deterministic pattern and/or rule. The terms "randomly selecting" or "pseudo-randomly selecting", as used herein with relation to an item, relate to choosing and/or selecting the item from two or more items according to a random or pseudo-random selection scheme, for example, based on a randomly or pseudo-randomly generated number or signal.

The term "secret data" as used herein relates to any suitable information and/or data, which may be internally processed, stored, maintained, handled, and/or utilized by a device, and which may not be intended to be revealed, disclosed, communicated, exposed, provided and/or outputted by the device. The device may process the secret data, for example, in order to generate output data, based on input data received by the device. In one example, the secret data may include cryptographic data maintained or stored within a cryptographic device, for example, a secret key, an encryption key, and the like. In another example, the secret data may be based on the input data, for example, if the input data includes encrypted data, and the secret data includes decrypted data resulting from decrypting the input data.

The term "state transition" as used herein with reference to a signal may include a change between first and second possible logical states of the signal. In one embodiment the state transition may include either a transition from the logical state '0' to the logical state '1', or a transition from the logical state '1' to the logical state '0'.

The term "state transition pattern" as used herein with reference to a signal may relate to a number, e.g., zero or any suitable positive integer, of state transitions of the signal within a clock; and/or a timing of the state transitions.

FIG. 1 schematically illustrates a block diagram of a system 100 including an Integrated Circuit (IC) 102, in accordance with some demonstrative embodiments.

In some embodiments, system 100 may include or may be part of a computing system including a processor 114, a memory 116, a storage unit 118, an input unit 120, an output unit 122, a communication unit 124, and/or any other suitable component. Processor 114 includes, for example, a multi-core processor (CMP), a multiprocessor, a central processing unit (CPU), a digital signal processor (DSP), a microprocessor, a host processor, a controller, a plurality of processors or controllers, a chip, a microchip, circuitry, a logic unit, an integrated circuit (IC), an application-specific IC (ASIC), or any other suitable multi-purpose or specific processor or controller. Memory 116 includes, for example, for example, a random access memory (RAM), a dynamic RAM (DRAM), a synchronous DRAM (SD-RAM), a flash memory, a volatile memory, or other suitable memory unit. Storage unit 118 includes, for example, a hard disk drive, a floppy disk drive, a compact disk (CD) drive, a CD-ROM drive, a digital versatile disk (DVD) drive, or other suitable removable or non-removable storage units. Input unit 120 includes, for example, a keyboard, a keypad, a mouse, a touch-pad, a stylus, a microphone, or other suitable pointing device or input device. Output unit 122 includes, for example, a cathode ray tube (CRT) monitor or display unit, a liquid crystal display (LCD) monitor or display unit, a screen, a monitor, a speaker, or other suitable display unit or output device. Communication unit 124 communication unit 116 includes, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 116 may optionally include, or may optionally be associated with, for example, one or more antennas, e.g., a dipole antenna, a monopole antenna, an omni-directional antenna, an end fed antenna, a circularly polarized antenna, a micro-strip antenna, a diversity antenna, or the like.

In some embodiments, system 100 may include, or may be, a Personal Computer (PC); a desktop computer; a mobile computer; a laptop computer; a notebook computer; a tablet computer; a server computer; a handheld computer; a handheld device; a Personal Digital Assistant (PDA) device; a handheld PDA device; an on-board device; an off-board device; a hybrid device; a vehicular device; a non-vehicular device; a mobile or portable device; a non-mobile or non-portable device; a wireless communication station; a wireless communication device; a wireless Access Point (AP); a wired or wireless router; a wired or wireless modem; a unit or device of a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), a two-way radio communication system, and/or a cellular radio-telephone communication system; a cellular telephone; a wireless telephone; a Personal Communication Systems (PCS) device; a PDA device which incorporates a wireless communication device; a mobile or portable Global Positioning System (GPS) device; a device which incorporates a GPS receiver or transceiver or chip; a device which incorporates an RFID element or chip; a Multiple Input Multiple Output (MIMO) transceiver or device; a Single Input Multiple Output (SIMO) transceiver or device, a Multiple Input Single Output (MISO) transceiver or device; a multi-standard radio device, a wired or wireless handheld device (e.g., BlackBerry, Palm Treo), a Wireless Application Protocol (WAP) device, or the like.

In some embodiments, IC 102 may include a cryptographic IC capable of receiving input data 168, for example, from processor 114, memory 116, storage 118, input unit 120, communication 124, and/or any other element of system 100, for example, an application (not shown) and/or Operating-System (OS) (not shown), which may be executed by system 100. Based on input data 168, IC 102 may generate output data 169 by processing secret data 109. Output date 169 may be provided, for example, to processor 114, memory 116, storage 118, output unit, communication 124, and/or any other element of system 100, for example, the application or OS.

Secret data 109 may include any suitable information and/or data, which may be internally processed, stored, maintained, handled, and/or utilized by IC 102, and which may not be intended to be revealed, disclosed, communicated, exposed, provided and/or outputted externally to IC 102, e.g., as part of output data 169. In one embodiment, secret data 109 may include cryptographic data internally maintained or stored within IC 102, for example, a secret key, an encryption key, and the like. In another embodiment, secret data 109 may be based on input data 168, for example, if input data 168 includes encrypted data, and secret data 109 includes decrypted data resulting from decrypting input data 168.

In some embodiments, IC 102 may introduce a pseudo-randomly selected modification to a state-transition pattern of a signal at least one signal, which is related to the processing of secret data 109, e.g., as described below.

In some embodiments, the processing of secret data 109 by IC 102 may involve, include or be related to one or more signals processed by at least one logical circuit 108. For example, logical circuit 108 may generate one or more output signals 112 by performing a logical operation on one or more input signals, e.g., at least one signal 110 and at least one signal 111. In one example, signal 111 and/or signal 110 may include at least part of secret data 109. In another example, signal 112 may be involved in the processing of at least part of secret data 109; for example, signal 112 may be input to another logical circuit together with one or more other signals including at least part of secret data 109.

In some demonstrative embodiments, an attack, for example, a side-channel attack, e.g., a DPA attack, may be performed on IC 102 in order to attempt to reveal secret data 109 or any part thereof by reviewing variations of the power consumed by IC 102, e.g., over a power line of IC 102. Such variations may be determined, for example, by monitoring a current provided to IC 102, a voltage drop at IC 102, or by any other suitable method.

In some embodiments, IC 102 may include at least one signal modifier 104 to generate at least one modified signal 110 by introducing a pseudo-randomly selected modification to a state-transition pattern of an input signal 106, which is to be provided to logical circuit 108. As a result, a power consumption of IC 102 may be statistically independent of secret data 109. For example, a timing of transitions in logical circuit 108, and thus a timing of power consumption spikes resulting from the operation of logical circuit 108, may be distorted and/or randomized in the view of an attacker.

In some embodiments, signal modifier 104 may introduce a pseudo-randomly selected modification to at least one of a number and a timing of one or more state transitions of signal 106 within a clock cycle, e.g., as described below.

Figure 2:
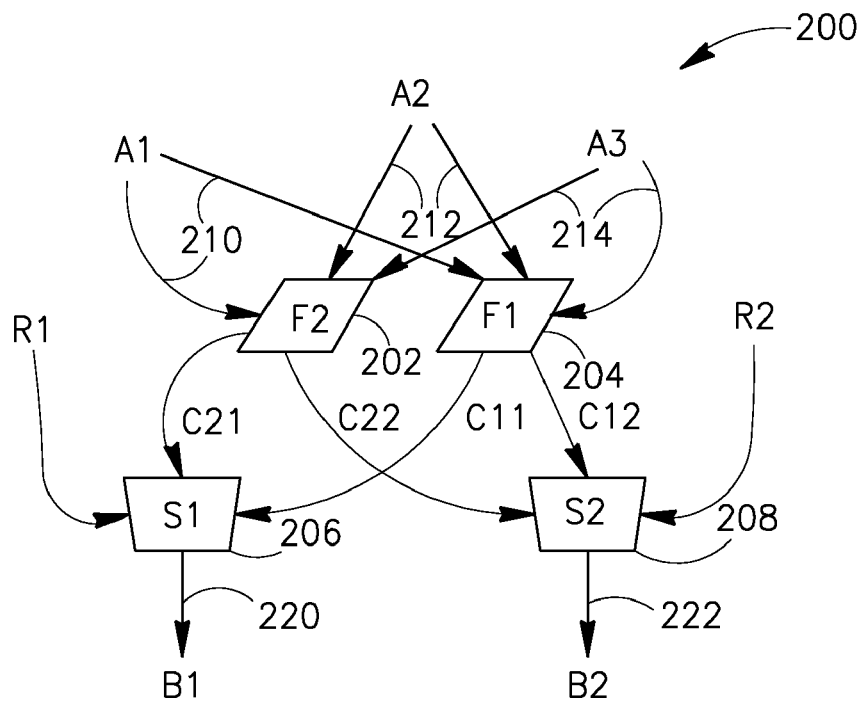
FIG. 2 is a schematic illustration of a signal modification scheme, in accordance with some demonstrative embodiments.

Reference is now made to FIG. 2, which schematically illustrates a signal modification scheme 200 in accordance with some demonstrative embodiments. In one embodiment, signal modification scheme 200 may perform the functionality of signal modifier 104 (FIG. 1).

In some embodiments, signal modification scheme 200 may be implemented to introduce a pseudo-randomly selected delay to one or more modified output signals, which may result from applying at least one predefined function to one or more input signals. For example, signal modification scheme 200 may introduce a pseudo-randomly selected delay to a first output signal 220, denoted B1, and a second output signal 222, denoted B2, which may result from applying a predefined function, denoted F, to a first input signal 210, denoted A1, a second input signal 212, denoted A2, and a third input signal 214, denoted A3.

In some embodiments, signal modification scheme 200 may include at least two function modules to generate at least one set of two or more respective intermediate signals by applying to the one or more input signals two or more logically identical functions having at least two different delay periods, respectively. For example, signal modification scheme 200 may include a first function module 204 to generate a first set of first and second intermediate signals C11 and C12 by applying to signals 210, 212, and 214 a first function, denoted F1, which may be logically identical to the function F, and may have a first delay period; and a second function module 202 to generate a second set of first and second intermediate signals C21 and C22 by applying to signals 210, 212, and 214 a second function, denoted F2, which may be logically identical to the function F1, and may have a second delay period different from the first delay period of the function F1. The signals C11 and C21 may be logically identical to one another, and logically identical to a first output of applying the function F to the input signals; and the signals C12 and C22 may be logically identical to one another, and logically identical to a second output of applying the function F to the input signals. The signals C11 and C12 may have the first delay associated with the function F1; while the signals C21 and C22 may have the second delay associated with the function F2.

In some embodiments, signal modification scheme 200 may also include one or more selectors to generate the one or more output signals, respectively, by pseudo-randomly selecting one of the two or more intermediate signals. For example, signal modification scheme 200 may include a first selector 206, denoted S1, to generate output signal 220 by pseudo-randomly selecting one of intermediate signals C11 and C21, e.g., based on the value of a pseudo-random signal R1; and a second selector 208, denoted S2, to generate output signal 222 by pseudo-randomly selecting one of intermediate signals C12 and C22, e.g., based on the value of a pseudo-random signal R2. As a result, the signals B1 and B2 may be logically identical to the first and second outputs resulting from applying the function F to input signals A1, A2 and A3, while each of the signals B1 and B2 may be delayed by a pseudo-randomly selected delay period, e.g., one of the delay periods of the functions F1 and F2.

In some embodiments, signal modification scheme 200 may be configured to support any introduction of a pseudo-randomly selected delay to any suitable number of modified output signals, which may result from applying any suitable number of predefined functions to any suitable number of input signals. In one example, signal modification scheme 200 may be configured to introduce a pseudo-randomly selected delay to an input signal. For example, functions F1 and F2 may be configured to include two respective identity functions having different delays, and each having a single input and output; and signal modification scheme 200 may include a single selector to pseudo-randomly select between the outputs of the functions F1 and F2, thereby to generate a modified output signal delayed by a pseudo-randomly delay period with respect to the input signal.

Figure 3:
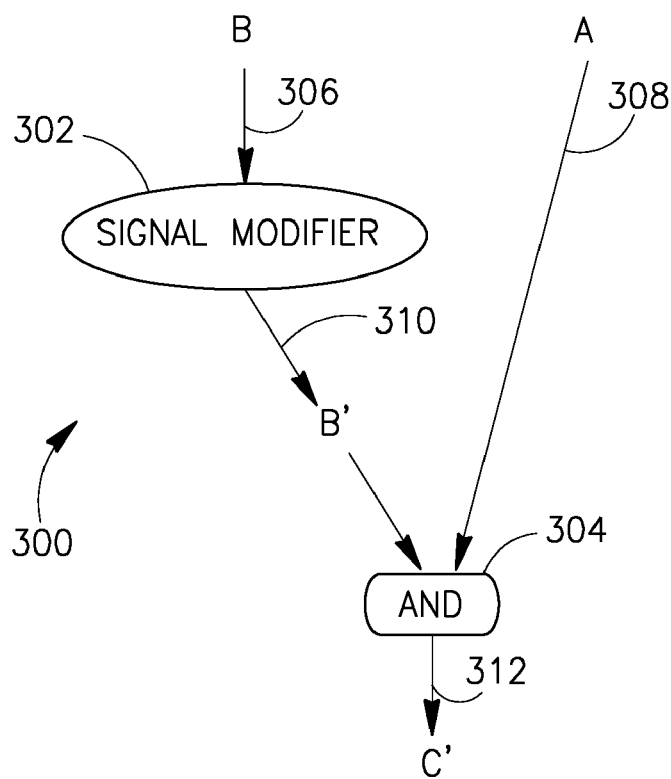
FIG. 3 is a schematic illustration of a circuitry arrangement including a signal modifier to modify a signal input to an AND logical circuit, in accordance with some demonstrative embodiments.

Reference is now made to FIG. 3, which schematically illustrates a circuitry arrangement 300 including a signal modifier 302 to modify a signal input to an AND logical circuit 304, in accordance with some demonstrative embodiments. In one embodiment, signal modifier 302 and logical circuit 304 may perform the functionality of signal modifier 104 (FIG. 1) and logical circuit 108 (FIG. 1), respectively.

In some embodiments, signal modifier 302 may introduce a pseudo-randomly selected delay period to a first input signal 306, denoted B, to thereby generate a modified signal 310, denoted B' to be provided as a first input to AND circuit 304. A second input signal 308, denoted A, may be provided as a second input to AND circuit 304. Logical circuit 304 may perform a logical AND operation on the first and second inputs, thereby to generate an output signal 312, denoted C', wherein C'=(A) AND (B').

In one embodiment, signal modifier 302 may be implemented using signal modification scheme 200 (FIG. 1) in the configuration adapted to introduce a pseudo-randomly selected delay to a single input signal, e.g., as described above. In other embodiments, signal modifier 302 may implement any other suitable scheme capable of introducing a pseudo-randomly selected delay to signal 306.

Figure 4:
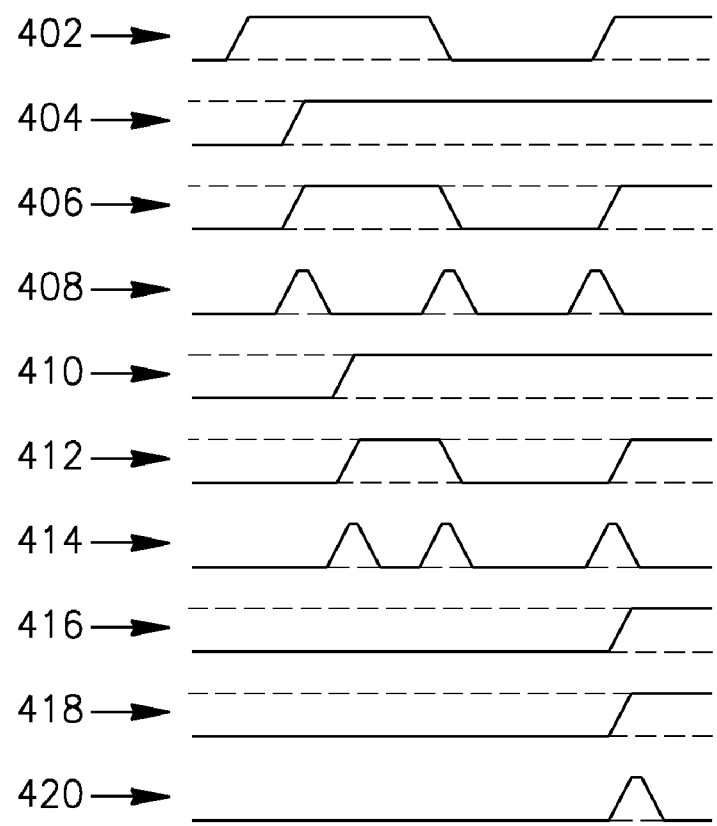
FIG. 4 is a schematic illustration of a power consumption curve resulting from not introducing any delay to an input signal of the logical circuit of FIG. 3; and two power consumption curves resulting from introducing first and second respective delays to the input signal, in accordance with one demonstrative embodiment.

Reference is also made to FIG. 4, which schematically illustrates a power consumption curve 408 resulting from not introducing any delay to the input signal B; and two power consumption curves 414 and 420 resulting from introducing first and second respective delays to the input signal B, in accordance with one demonstrative embodiment.

As shown in FIG. 4, power consumption curve 408 corresponds to a state transition pattern 406 of an output signal C resulting from applying the AND operation to a state transition pattern 402 of the input signal A and a state transition pattern 404 of the input signal B within a clock cycle.

As shown in FIG. 4, introducing the first delay to the signal B may result in the modified signal B' having a first modified state transition pattern 410; and introducing the second delay, which may be longer than the first delay, to the signal B may result in the modified signal B' having a second modified state transition pattern 416. Accordingly, power consumption curve 414 corresponds to a state transition pattern 412 of the output signal C' resulting from the introduction of the first delay, power consumption curve 420 corresponds to a state transition pattern 418 of the output signal C' resulting from the introduction of the second delay.

As shown in FIG. 4, pseudo-randomly selecting the delay introduced to the input signal B, e.g., pseudo-randomly selecting between the first end second delays resulting in state transition patterns 410 and 416, respectively, may result in a power consumption pseudo-randomly acting according to one of a plurality of curves, e.g., either one of curves 414 and 420. Accordingly, a correlation between the power consumption of arrangement 300 (FIG. 3) and the signals A and/or B and/or any processing of data relating to the signal C', may be reduced.

Referring back to FIG. 1, in some demonstrative embodiments signal modifier 104 may be capable of modifying signal 106 to generate modified signal 110 such that a logical state of modified signal 110 at the beginning of a clock cycle is the same as a logical state of signal 106 at the beginning of the clock cycle, and a number of state transitions in modified signal 110 and a number of state transitions in input signal 106 may have the same parity, e.g., as described below. The number zero may be considered to be even.

The term "average power consumption" as used herein with relation to the processing of a pseudo-randomly modified signal, e.g., modified signal 110, may relate to an average of a plurality of power consumption curves resulting from a plurality of possible transition patterns of the modified signal. For example, if the modified signal resulting from a certain state transition pattern of the input signal may have a pseudo-randomly selected one of n state transition patterns, then the average power consumption of corresponding to the modified signal may be determined by averaging n power consumption curves corresponding to the n state transition patterns.

In some embodiments, an average power consumption resulting from processing modified signal 110 may be statistically independent of the state transition pattern of signal 106. For example, the same average power consumption corresponding to modified signal 110 may be achieved for a plurality of different possible state transition patterns of signal 106, e.g., as described below.

Reference is made to FIGS. 5, 6, 7, and 8, which schematically illustrate four respective sets of first and second transition patterns of modified signal 110 resulting from applying first and second modification schemes to four respective state transition patterns of signal 106 within a clock cycle, in accordance with some demonstrative embodiments.

Figure 5:
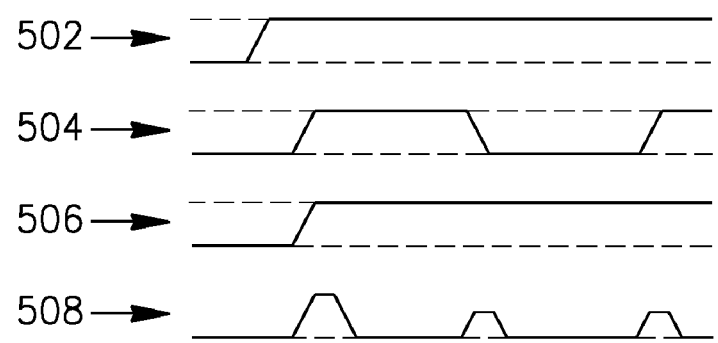
FIGS. 5, 6, 7 and 8 are schematic illustrations of four respective sets of first and second transition patterns of a modified signal resulting from applying first and second modification schemes to four respective state transition patterns of a signal within a clock cycle, in accordance with some demonstrative embodiments.

As shown in FIG. 5, a first state transition pattern 502 of signal 106 may include a single state transition from the logical state '0' to the logical state '1'; a first state transition pattern 504 of modified signal 110 resulting from pattern 502 may include three state transitions from the logical state '0' to the logical state '1'; and a second state transition pattern 506 of modified signal 110 resulting from pattern 502 may include one state transition from the logical state '0' to the logical state '1', which may be delayed compared to the state transition of signal 106. An average power consumption curve 508 may correspond to patterns 504 and 506.

Figure 6:
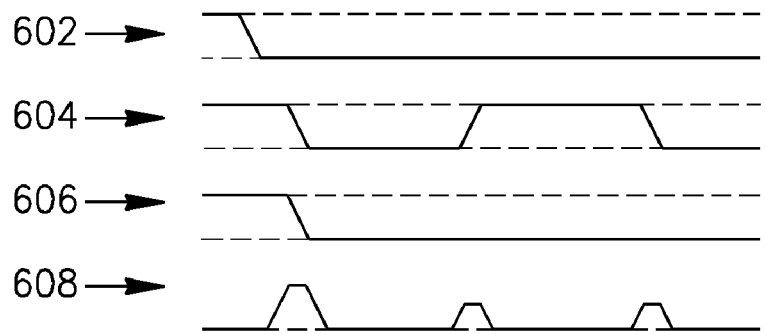

As shown in FIG. 6, a second state transition pattern 602 of signal 106 may include a single state transition from the logical state '1' to the logical state '0'; a first state transition pattern 604 of modified signal 110 resulting from pattern 602 may include three state transitions from the logical state '1' to the logical state '0'; and a second state transition pattern 606 of modified signal 110 resulting from pattern 602 may include one state transition from the logical state '1' to the logical state '0', which may be delayed compared to the state transition of signal 106. An average power consumption curve 608 corresponding to patterns 604 and 606 may be substantially identical to average power consumption curve 508.

Figure 7:
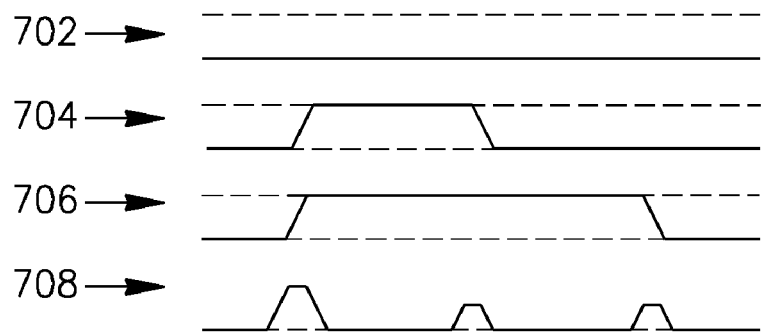

As shown in FIG. 7, a third state transition pattern 702 of signal 106 may include the logical state '0' with no state transitions; a first state transition pattern 704 of modified signal 110 resulting from pattern 702 may include two state transitions from the logical state '0' back to the logical state '0'; and a second state transition pattern 706 of modified signal 110 resulting from pattern 702 may include two state transitions from the logical state '0' back to the logical state '0'. A first state transition of patterns 704 and 706 may be substantially simultaneously, and a second state transition of pattern 706 may be delayed with respect to a second transition of pattern 704. An average power consumption curve 708 corresponding to patterns 704 and 706 may be substantially identical to average power consumption curves 508 and 608.

Figure 8:
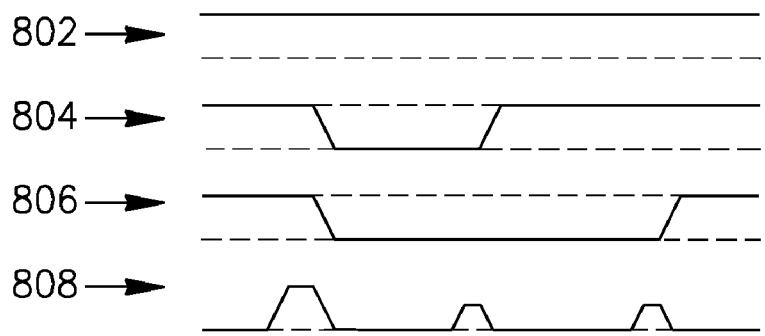

As shown in FIG. 8, a fourth state transition pattern 802 of signal 106 may include the logical state '1' with no state transitions; a first state transition pattern 804 of modified signal 110 resulting from pattern 802 may include two state transitions from the logical state '1' back to the logical state '1'; and a second state transition pattern 806 of modified signal 110 resulting from pattern 802 may include two state transitions from the logical state '1' back to the logical state '1'. A first state transition of patterns 804 and 806 may be substantially simultaneously, and a second state transition of pattern 806 may be delayed with respect to a second transition of pattern 804. An average power consumption curve 808 corresponding to patterns 804 and 806 may be substantially identical to average power consumption curves 508, 608 and 708.

In some embodiments, signal modifier 104 may be capable of generating modified signal 110 having one of the first and second transition patterns of FIGS. 5, 6, 7, and 8 by delaying input signal 106 for a predefined delay period, and performing a logical XOR operation on the delayed signal and a transitional-glitch signal pseudo-randomly selected from at least first and second predefined transitional-glitch signals of different durations, as described in detail below. The term "transitional-glitch signal" as used herein may relate to a signal having at least one pair of a first transition from a first logical state to a second logical sate and a second transition from the second logical state back to the first logical state.

Figure 9:
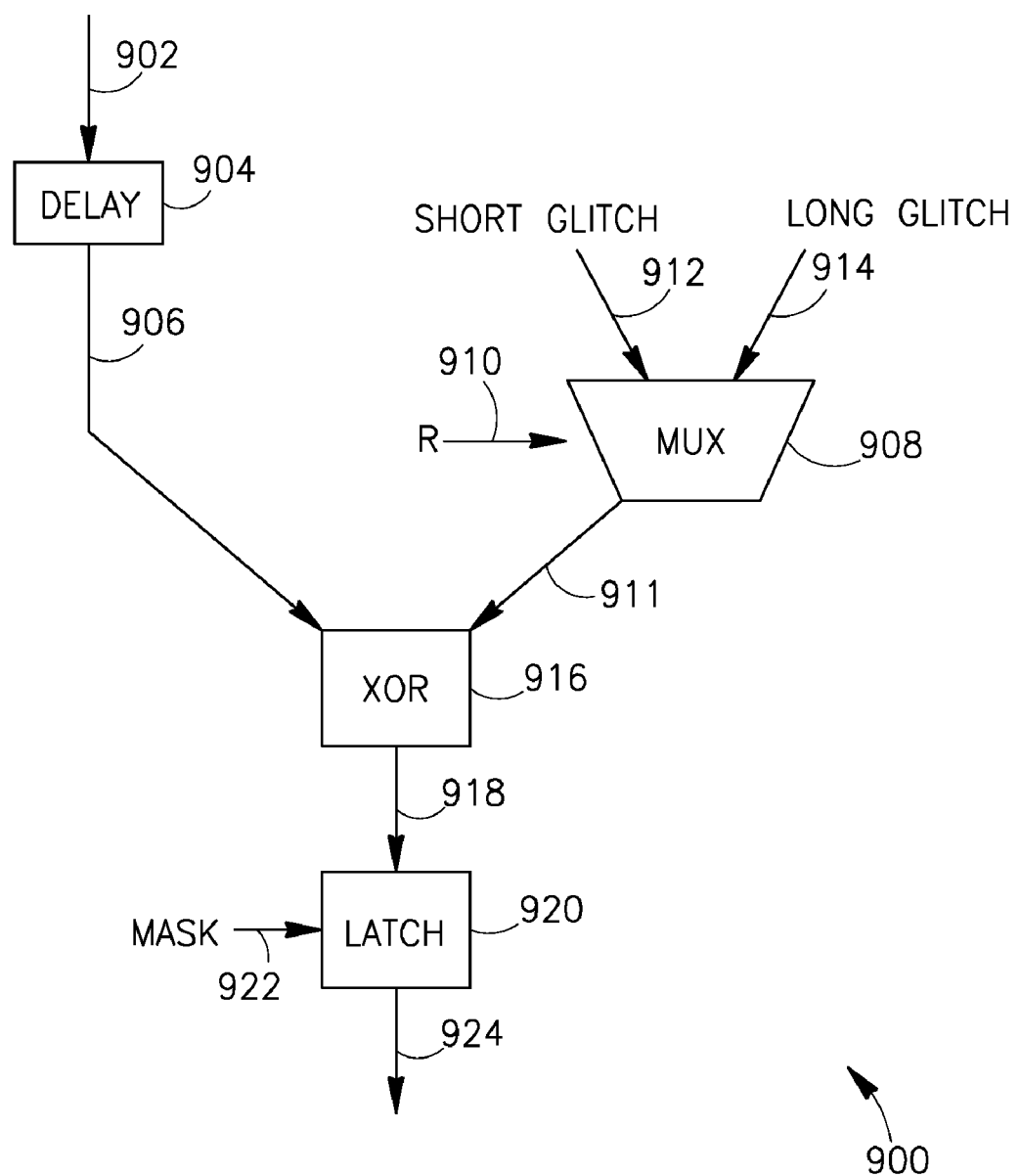
FIG. 9 is a schematic illustration of a signal modifier, in accordance with some demonstrative embodiments.

Reference is made to FIG. 9, which schematically illustrates a signal modifier 900, in accordance with some demonstrative embodiments. In one embodiment, signal modifier 900 may perform the functionality of signal modifier 104 (FIG. 1).

In some embodiments, signal modifier 900 may generate a modified signal 924, e.g., signal 110 (FIG. 1), by introducing a pseudo-randomly selected modification to a state-transition pattern of an input signal 902, e.g., signal 106 (FIG. 1).

In some embodiments, signal modifier 900 may include a delay module 904 to generate a delayed signal 906 by delaying input signal 902 for a predefined delay period, e.g., as described below. Delay module 904 may include any suitable buffer, chain of inverters, and/or any other suitable element capable of delaying signal 902 for the predefined period.

In some embodiments, signal modifier 900 may include selector 908, e.g., a multiplexer (MUX), to pseudo-randomly select, based on a pseudo-random signal 910, a transitional-glitch signal 911 from a first transitional-glitch signal 912 ("short glitch") having a first duration and a second transitional-glitch signal 914 ("long glitch") having a second duration longer than the first duration, e.g., as described below.

In some demonstrative embodiments, signal modifier 900 may include a XOR module 916 to apply a logical XOR operation on delayed signal 906 and pseudo-randomly selected transitional-glitch signal 911, thereby to generate a signal 918.

In some embodiments, a first state transition of signal 912 and a first state transition of signal 914 may occur substantially simultaneously, a second state transition of signal 912 may occurs before a second state transition of signal 914; and a length of the predefined delay period may depend on the second state transition of signal 914, e.g., such that the state transition of delayed signal 906 may be intended to occur substantially simultaneously with the second state transition of signal 914, e.g., as shown in FIGS. 10, 11, 12, and 13 described below.

In some embodiments, signal modifier 900 may include a latch 920 to generate modified signal 924 by masking signal 918 according to a mask signal 922. Mask signal 922 may be implemented in order, for example, to eliminate a transition glitch which may be introduced to signal 918 if the state transition of delayed signal 906 and the second state transition of signal 914 do not occur substantially simultaneously. For example, mask 922 may be based on the length of the predefined delay period and on the second state transition of signal 914. Latch 920 may be open, for example, only when mask signal 918 has a predefined logical state, e.g., the logical state '1'.

Reference is also made to FIGS. 10, 11, 12, and 13, which schematically illustrate state transition patterns resulting from applying to signals 502 (FIG. 5), 602 (FIG. 6), 702 (FIG. 7), and 802 (FIG. 8), respectively, a predefined delay, a first transitional-glitch signal 1004, a second transitional-glitch signal 1006, and a mask signal 1012, in accordance with some demonstrative embodiments. In one embodiment, signals 1004, 1006 and 1012 may include signals 912, 914 and 922, respectively.

Figure 10:
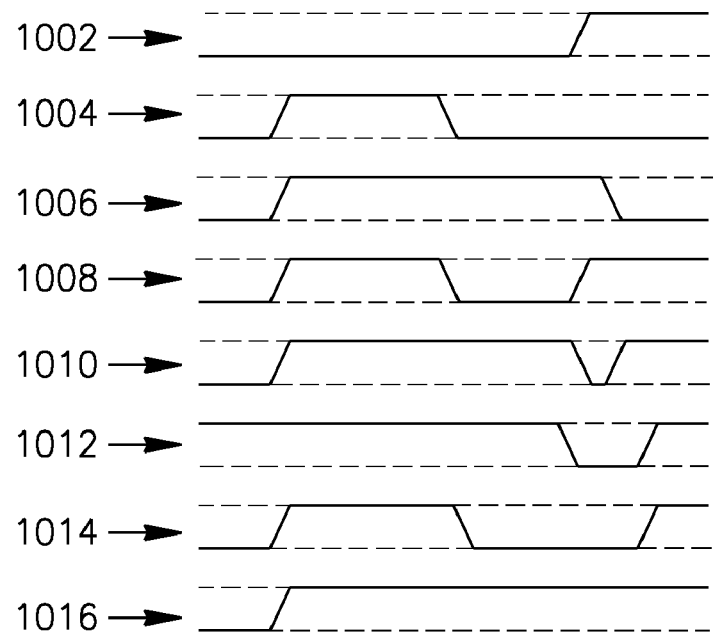
FIGS. 10, 11, 12 and 13 are schematic illustrations of state transition patterns resulting from applying to the state-transition patterns of the signal of FIGS. 5, 6, 7 and 8, respectively, a predefined delay, a first transitional-glitch signal, a second transitional-glitch signal, and a mask signal, in accordance with some demonstrative embodiments.

As shown in FIG. 10, delayed signal 906 may have a state-transition pattern 1002 if the predefined delay is applied to signal 502 (FIG. 5). Signal 918 may have a state transition pattern 1008, if transitional-glitch signal 1004 is selected by selector 908 to be XORed with delayed signal 906; or a state transition pattern 1010, if transitional-glitch signal 1006 is selected by selector 908 to be XORed with delayed signal 906. Modified signal 924 may have a state-transition pattern 1014, if mask signal 1012 is applied to state-transition pattern 1008; or a state transition pattern 1016 if mask signal 1012 is applied to state-transition pattern 1010. State transition patterns 1014 and 1016 may be substantially identical to state transition patterns 504 (FIG. 5) and 506 (FIG. 5), respectively.

Figure 11:
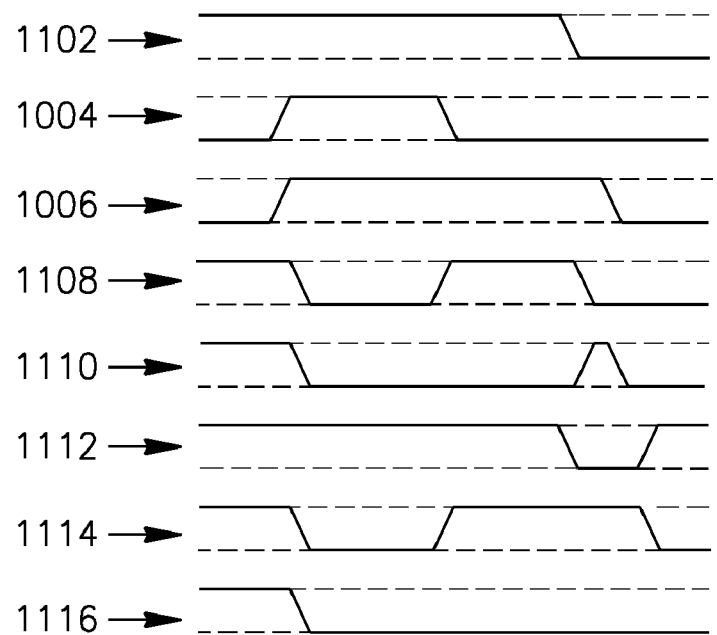

As shown in FIG. 11, delayed signal 906 may have a state-transition pattern 1102 if the predefined delay is applied to signal 602 (FIG. 6). Signal 918 may have a state transition pattern 1108, if transitional-glitch signal 1004 is selected by selector 908 to be XORed with delayed signal 906; or a state transition pattern 1110, if transitional-glitch signal 1006 is selected by selector 908 to be XORed with delayed signal 906. Modified signal 924 may have a state-transition pattern 1114, if mask signal 1012 is applied to state-transition pattern 1108; or a state transition pattern 1116 if mask signal 1012 is applied to state-transition pattern 1110. State transition patterns 1114 and 1116 may be substantially identical to state transition patterns 604 (FIG. 6) and 606 (FIG. 6), respectively.

Figure 12:
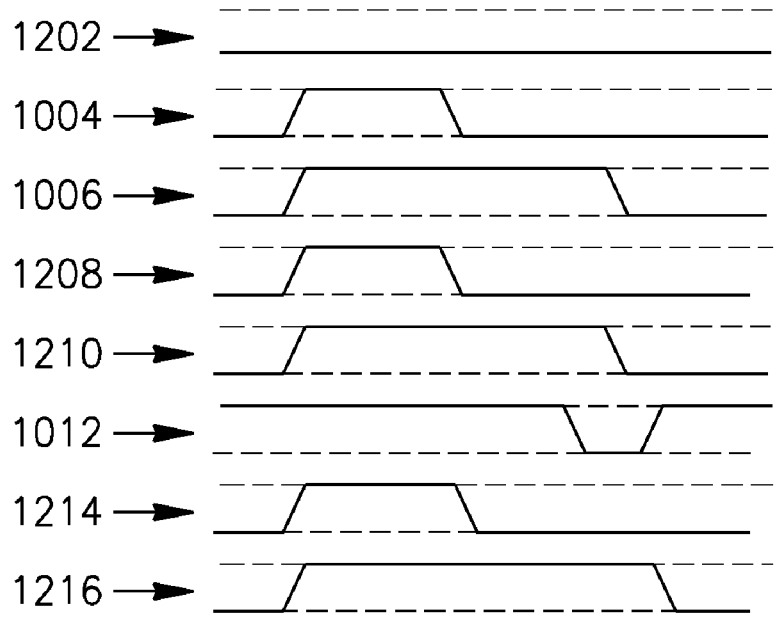

As shown in FIG. 12, delayed signal 906 may have a state-transition pattern 1202 if the predefined delay is applied to signal 702 (FIG. 7). Signal 918 may have a state transition pattern 1208, if transitional-glitch signal 1004 is selected by selector 908 to be XORed with delayed signal 906; or a state transition pattern 1210, if transitional-glitch signal 1006 is selected by selector 908 to be XORed with delayed signal 906. Modified signal 924 may have a state-transition pattern 1214, if mask signal 1012 is applied to state-transition pattern 1208; or a state transition pattern 1216 if mask signal 1012 is applied to state-transition pattern 1210. State transition patterns 1214 and 1216 may be substantially identical to state transition patterns 704 (FIG. 7) and 706 (FIG. 7), respectively.

Figure 13:
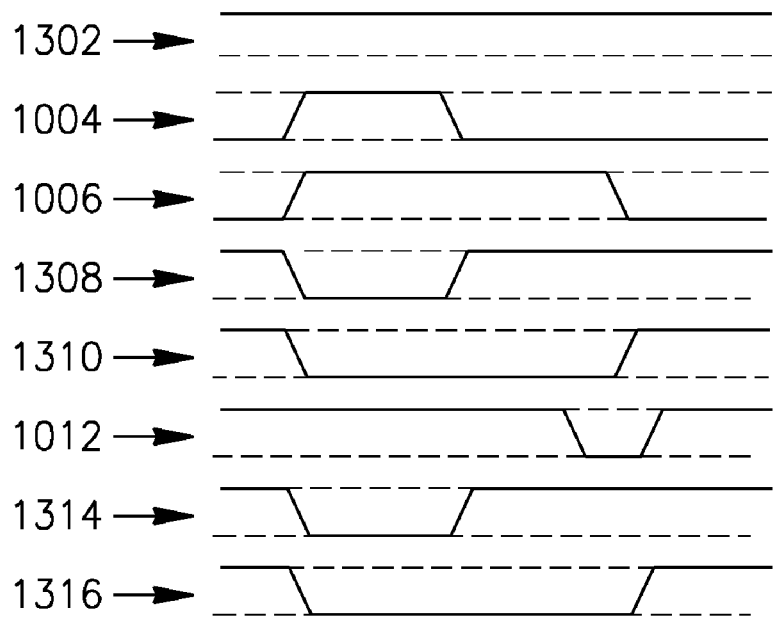

As shown in FIG. 13, delayed signal 906 may have a state-transition pattern 1302 if the predefined delay is applied to signal 802 (FIG. 8). Signal 918 may have a state transition pattern 1308, if transitional-glitch signal 1004 is selected by selector 908 to be XORed with delayed signal 906; or a state transition pattern 1310, if transitional-glitch signal 1006 is selected by selector 908 to be XORed with delayed signal 906. Modified signal 924 may have a state-transition pattern 1314, if mask signal 1012 is applied to state-transition pattern 1308; or a state transition pattern 1316 if mask signal 1012 is applied to state-transition pattern 1310. State transition patterns 1314 and 1316 may be substantially identical to state transition patterns 804 (FIG. 8) and 806 (FIG. 8), respectively.

Figure 14:
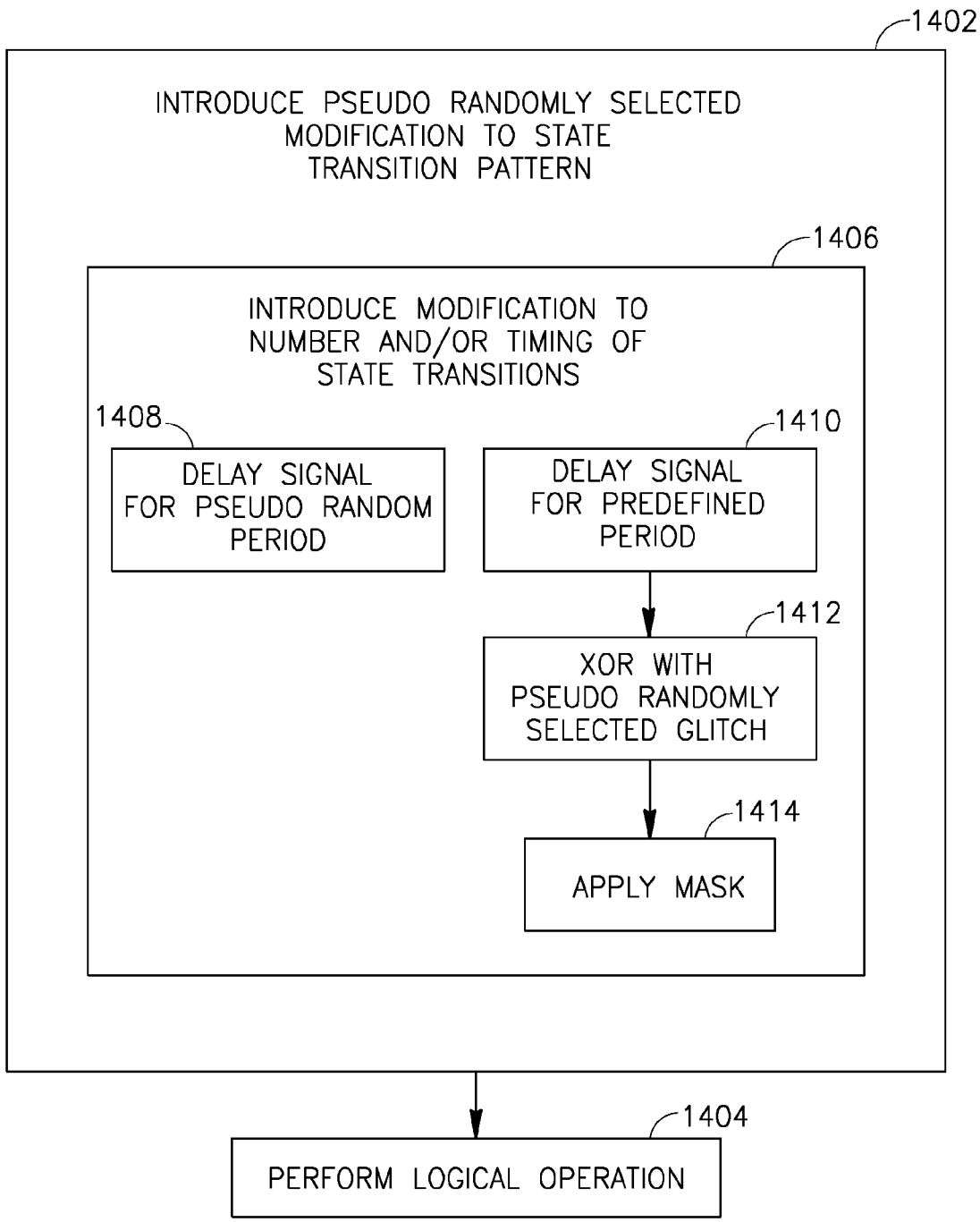
FIG. 14 is a schematic flow-chart illustration of a method of obfuscating data internally processed within an integrated circuit, in accordance with some demonstrative embodiments.

Reference is now made to FIG. 14, which schematically illustrates a method of obfuscating data internally processed within an integrated circuit, in accordance with some demonstrative embodiments. In one embodiment, one or more operations of the method of FIG. 14 may be performed by one or more elements of IC 102 (FIG. 1), e.g., signal modifier 104 (FIG. 1).

As indicated at block 1402, the method may include introducing a pseudo-randomly selected modification to a state-transition pattern of at least one signal, which is related to the processing of the data. For example, signal modifier 104 (FIG. 1) may introduce a randomly selected modification to a state-transition pattern of signal 106 (FIG. 1), as described above.

As indicated at block 1404, the method may include performing a logical operation on a modified signal resulting from introducing the modification. For example, logical circuit 108 (FIG. 1) may perform a logical operation on modified signal 116 (FIG. 1), as described above.

As indicated at block 1406, the introducing may include introducing a pseudo-randomly selected modification to at least one of a number and a timing of one or more state transitions of the signal within a clock cycle.

As indicated at block 1408, in some embodiments the introducing may include delaying the signal for a pseudo-randomly selected delay period, e.g., as described above with reference to FIGS. 3 and/or 4.

In some embodiments a number of state transitions in the modified signal resulting from the introducing and a number of state transitions in the signal may have the same parity. For example, the introducing may include delaying the signal for a predefined delay period, as indicate at block 1410; and performing a logical XOR operation on the delayed signal and a transitional-glitch signal pseudo-randomly selected from at least first and second predefined transitional-glitch signals of different durations, as indicated at block 1412.

In some embodiments, a first state transition of the first glitch signal and a first state transition of the second glitch signal occur substantially simultaneously; a second state transition of the first glitch signal occurs before a second state transition of the second glitch signal; and a length of the predefined delay period depends on the second state transition of the second glitch signal, e.g., as described above.

As indicated at block 1414, the introducing may include masking the result of the XOR operation according to a mask signal, which is based on the length of the predefined delay period and the second state transition of the second glitch signal, e.g., as described above.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An integrated circuit comprising:
a signal modifier to introduce a pseudo-randomly selected modification to a state-transition pattern of at least one signal which is involved in internal processing of secret data within said integrated circuit,
wherein the signal modifier is to obfuscate said secret data processed within a hardware implementation of said integrated circuit and to protect said secret data from a side-channel attack; and
control logic adapted to regulate said signal modifier such that a different pseudo-randomly selected signal modification is introduced intermittently,
wherein the secret data obfuscated within said integrated circuit comprises at least one of: (a) an encryption key; (b) decrypted data resulting from decrypting, within said integrated circuit, of encrypted input data;
wherein the signal modifier is to distort, during operation of a logical circuit within said integrated circuit, a timing of a power consumption spike of said logical circuit;
wherein the signal modifier is implemented using at least a hardware component.

2. The integrated circuit of claim 1, wherein said signal modifier is to generate at least one modified signal by introducing said pseudo-randomly selected modification to a state-transition pattern of an input signal, and wherein said integrated circuit comprises a logical circuit to perform a logical operation on said modified signal.

3. The integrated circuit of claim 2, wherein said signal modifier is to introduce a pseudo-randomly selected modification to at least one of a number and a timing of one or more state transitions of said signal within a clock cycle, wherein the signal modifier is to generate a modified signal from an input signal, wherein a logical state of the modified signal at a beginning of a clock cycle is identical to a logical state of the input signal at the beginning of the clock cycle.

4. The integrated circuit of claim 3, wherein said signal modifier is to delay said signal for a pseudo-randomly selected delay period.

5. The integrated circuit of claim 3 wherein, within said clock cycle, a number of state transitions in said modified signal and a number of state transitions in said input signal have the same parity.

6. The integrated circuit of claim 3, wherein said signal modifier is to delay said input signal for a predefined delay period, and to perform a logical XOR operation on the delayed signal and a transitional-glitch signal pseudo-randomly selected from at least first and second predefined transitional-glitch signals of different durations.

7. The integrated circuit of claim 6, wherein a first state transition of said first glitch signal and a first state transition of said second glitch signal occur substantially simultaneously,
wherein a second state transition of said first glitch signal occurs before a second state transition of said second glitch signal, and
wherein a length of said predefined delay period depends on the second state transition of said second glitch signal,
wherein the signal modifier comprises a latch to generate a modified signal based on an input signal and a mask signal, wherein the mask signal is based on a length of a predefined delay period, wherein the latch is open only when the mask signal has a predefined logical state.

8. The integrated circuit of claim 7, wherein said signal modifier is to mask the result of said XOR operation according to a mask signal, which is based on the length of said predefined delay period and the second state transition of said second glitch signal;
wherein the signal modifier is to obfuscate secret data processed by an AND logical circuit of said integrated circuit by:
receiving a first input signal (A) and a second input signal (B) directed to the AND logical circuit;
providing the first input signal (A) to the AND logical circuit;
providing to the AND logical circuit a modified input signal (B') by introducing a pseudo-randomly selected delay period to the second input signal (B) of said AND logical circuit;
performing, by the AND logical circuit, an AND logical operation on the first input signal (A) and on the modified input signal (B'), and generating an output signal from said AND logical circuit.

9. The integrated circuit of claim 1, wherein said signal modifier comprises:
two or more function modules to generate at least one set of two or more respective intermediate signals by applying to at least one input signal two or more logically identical functions having at least two different delay periods, respectively; and
at least one selector to generate at least one modified signal, respectively, by pseudo-randomly selecting one of said two or more intermediate signals.

10. The integrated circuit of claim 1 comprising a cryptographic integrated circuit to receive input data and generate output data by internally processing said data, and wherein a power consumption of said cryptographic integrated circuit is statistically independent of said data.

11. A method of handling secret data internally processed within a hardware implementation of an integrated circuit, the method comprising:
introducing a pseudo-randomly selected modification to a state-transition pattern of at least one signal, which is involved in the processing of said secret data,
wherein said introducing of the pseudo-randomly selected modification to the state-transition pattern comprises obfuscating said secret data processed within said hardware implementation of said integrated circuit and protecting said secret data from a side-channel attack,
wherein said obfuscating comprises regulating a signal modifier such that a different pseudo-randomly selected signal modification is introduced intermittently,
wherein the secret data obfuscated within said integrated circuit comprises at least one of: (a) an encryption key; (b) decrypted data resulting from decrypting, within said integrated circuit, of encrypted input data;
wherein said obfuscating comprises: during operation of a logical circuit within said integrated circuit, distorting a timing of a power consumption spike of said logical circuit;
wherein the method is to be performed by an electronic device.

12. The method of claim 11 comprising performing a logical operation on a modified signal resulting from said introducing.

13. The method of claim 11, wherein said introducing comprises introducing a pseudo-randomly selected modification to at least one of a number and a timing of one or more state transitions of said signal within a clock cycle, wherein said obfuscating comprises: generating a modified signal from an input signal, wherein a logical state of the modified signal at a beginning of a clock cycle is identical to a logical state of the input signal at the beginning of the clock cycle.

14. The method of claim 13, wherein said introducing comprises delaying said signal for a pseudo-randomly selected delay period.

15. The method of claim 13 wherein, within said clock cycle, a number of state transitions in a modified signal resulting from said introducing and a number of state transitions in said signal have the same parity.

16. The method of claim 13, wherein said introducing comprises:
   delaying said signal for a predefined delay period; and
   performing a logical XOR operation on the delayed signal and a transitional-glitch signal pseudo-randomly selected from at least first and second predefined transitional-glitch signals of different durations.

17. The method of claim 16, wherein a first state transition of said first glitch signal and a first state transition of said second glitch signal occur substantially simultaneously,
   wherein a second state transition of said first glitch signal occurs before a second state transition of said second glitch signal, and
   wherein a length of said predefined delay period depends on the second state transition of said second glitch signal,
   wherein said obfuscating comprises: utilizing a latch to generate a modified signal based on an input signal and a mask signal, wherein the mask signal is based on a length of a predefined delay period, wherein the latch is open only when the mask signal has a predefined logical state.

18. The method of claim 17, wherein said introducing comprises masking the result of the XOR operation according to a mask signal, which is based on the length of said predefined delay period and the second state transition of said second glitch signal;
   wherein said obfuscating comprises: obfuscating secret data processed by an AND logical circuit of said integrated circuit by:
      receiving a first input signal (A) and a second input signal (B) directed to the AND logical circuit;
      providing the first input signal (A) to the AND logical circuit;
      providing to the AND logical circuit a modified input signal (B') by introducing a pseudo-randomly selected delay period to the second input signal (B) of said AND logical circuit;
      performing, by the AND logical circuit, an AND logical operation on the first input signal (A) and on the modified input signal (B'), and generating an output signal from said AND logical circuit.

19. The method of claim 11 comprising:
   applying to said at least one signal two or more logically identical functions having at least two different delay periods, respectively, thereby to generate at least one set of two or more respective intermediate signals; and
   generating at least one modified signal by pseudo-randomly selecting one of said two or more intermediate signals.

20. The method of claim 11, wherein a power consumption of said integrated circuit is statistically independent of said data.

* * * * *